United States Patent [19]

Houghton, Jr. et al.

[11] 3,726,513
[45] Apr. 10, 1973

[54] NOZZLE IMPINGEMENT SCRUBBER

[76] Inventors: Graham K. Houghton, Jr., 2844 Lawndale Drive, Los Angeles, Calif. 90065; Floyd W. Redman, 1005 Radcliff Avenue, Bakersfield, Calif. 93305

[22] Filed: May 13, 1971

[21] Appl. No.: 143,262

Related U.S. Application Data

[63] Continuation of Ser. No. 880,668, Nov. 28, 1969, abandoned.

[52] U.S. Cl. ..................261/119, 55/248, 55/257, 261/DIG. 54
[51] Int. Cl. ............................................B01d 47/02
[58] Field of Search....................55/239, 235–238, 55/92; 261/79 A, 119, DIG. 54

[56] References Cited

UNITED STATES PATENTS 2,226,127    12/1940    Harmon ..............................55/237
2,792,905    5/1957    Forrest..................................55/239

FOREIGN PATENTS OR APPLICATIONS 331,840    9/1958    Switzerland..........................55/250

OTHER PUBLICATIONS

Leckenby Tornado Gas Scrubber, Manufactured by Leckenby Company, Seattle, Washington, pages 1–4, dated Mar. 28, 1968.

*Primary Examiner*—Bernard Nozick
*Attorney*—E. Wallace Breisch

[57]    ABSTRACT

A nozzle impingement scrubber chamber having a central clean gas outlet including a nozzle structured such that substantially no quiescent zone exists adjacent the exit end thereof.

7 Claims, 3 Drawing Figures

PATENTED APR 10 1973 3,726,513

INVENTORS
GRAHAM K. HOUGHTON JR.
& FLOYD W. REDMAN

NOZZLE IMPINGEMENT SCRUBBER

This application is a continuation of application Ser. No. 880,668, filed Nov. 28, 1969 now abandoned.

One type of impingement scrubber used for removing particulate matter from a gas stream includes a shell having an annular nozzle at the lower end thereof which surrounds a clean gas outlet whereby a gas stream containing suspended particles is ejected through the nozzle at a high velocity against the surface of a scrubbing liquid whereby the suspended particles are driven into and retained by the scrubbing liquid and subsequently separated from the gas stream which exits through the central outlet.

With an impingement scrubber of the type described above, the nozzle must be structured to increase gas velocity to that required for proper impingement type scrubbing action. Prior designs of such nozzles are generally effected by the use of two sloping sections which converge to form the impingement nozzle. This form of double sloping section proved adequate to obtain the desired gas stream velocity; however, an inefficiency was continually present because of the quiescent zone which developed downwardly adjacent the outer of the sloping sections.

By use of the present invention, which includes a nozzle formed with a sloping section on the inner side adjacent the gas outlet and a vertical section formed by the inner wall surface of a surrounding casing, various advantages are apparent over previous nozzle designs, for example: substantial elimination of nozzle quiescent zones; reduced cost of fabrication; greater nozzle capacity for a given exterior shell diameter; and lower overall pressure drop.

These and other advantages of this invention will become more readily apparent from a reading of the following description and drawings in which.

Figure 1:
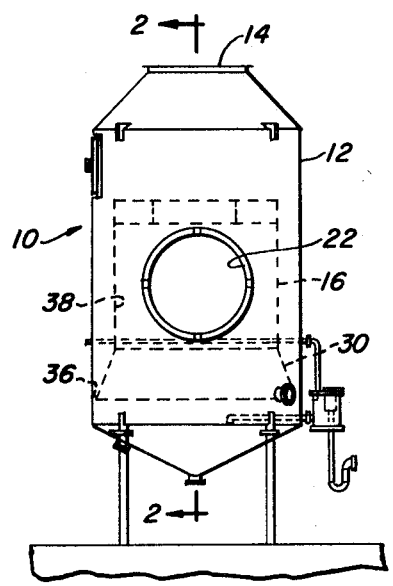
FIG. 1 is an elevational view of a gas scrubber incorporating the nozzle features of this invention.
Figure 2:
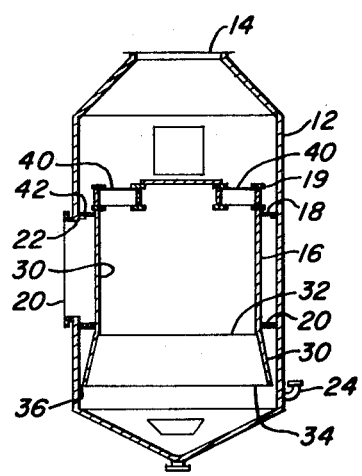
FIG. 2 is a cross-sectional view of the scrubber taken on line 2—2 of FIG. 1.

An impingement scrubber 10 includes a vertically disposed generally cylindrical casing 12 which is sealed at the lower end thereof and has a clean gas outlet 14 of a known configuration at the upper end thereof. A vertically disposed generally cylindrical riser duct 16 having an outer diameter thereof smaller than the inner diameter of casing 12 is coaxially received within casing 12 intermediate the axial ends thereof. As shown, the orientation of duct 16 is fixed with respect to casing 12 by means of an annular retaining plate 18 which has the inner periphery thereof sealingly secured to the outer periphery of duct 16 downwardly adjacent an upper end portion 19 of duct 16; and the outer periphery thereof sealingly secured to the inner surface of casing 12 intermediate the axial ends thereof. As conditions dictate, additional supports can be used to further fix duct 16 within casing 12, for example, a plurality of circumferentially spaced plates 20 which have the inner ends thereof fixed to the outer periphery of duct 16 upwardly adjacent the lower end thereof and extend radially outwardly therefrom and have the respective outer ends thereof fixedly secured to the inner surface of casing 12. A gas inlet 22 extends through casing 12 intermediate retaining plate 18 and the circumferential row of plates 20.

Impinging liquid 26 is supplied to scrubber 10 from a suitable source (not shown) by means of an impinging liquid inlet 24 located upwardly from the lower end of casing 12. As is known, in order for impinging liquid 26 to efficiently operate as a medium to remove particulate matter from a gas stream introduced to scrubber 10 through inlet 22, such gas stream must be projected against the surface 28 of liquid 26 at a sufficient velocity for particle retention to occur and it is to this end that peripheral nozzle member 30 of this invention is provided.

Nozzle member 30 comprises a hollow member generally shaped as a frustrum of a right circular cone having an upper end 32 thereof of an outer diameter equal to the outer diameter of the lower end of duct 16. End 32 is sealingly secured to the lower end of duct 16 and extends downwardly radially outwardly therefrom such that the lowermost end 34 of member 30 is spaced inwardly from the inner periphery of casing 12, such spacing forming an annular nozzle opening 36.

Inasmuch as member 30 slopes obliquely downwardly and outwardly to form opening 36, opening 36 thus presents a cross-sectional area through which the introduced gas stream must flow which is smaller than any cross-sectional area through which the gas stream passes from the inlet 22 until it reaches the outlet 14 and as such, the velocity of the gas exiting from opening 36 is increased from the velocity thereof prior to flowing through opening 36 and is also greater than the velocity following thereafter. Since as hereinabove stated development of sufficient velocity to cause particle retention is the purpose of the nozzle 30, the area ratios, being inversely related to the gas stream velocities, are important. It is well known that the increase in velocity which occurs within a nozzle is dependent upon the nozzle configuration that is, the throat of the nozzle has a smaller cross-sectional area than the flow path either upstream or downstream therefrom. When scaled the appended drawings show that the area of the inlet duct (equal to area of plate 18) (25.8 units) is virtually equal to four times the area of nozzle opening 36 (6.4 units) and that the internal area of outlet duct 16 (60.8 units) is equal to more than nine times the nozzle area. The surface 28 of the impinging liquid 26 is spaced downwardly adjacent the lower end 34 of nozzle member 30.

With an impingement scrubber 10 as described above, a gas containing particulate matter suspended therein is introduced through gas inlet 22 and, inasmuch as retaining plate 18 is sealingly secured to duct 16 and casing 12 upwardly adjacent inlet 22, such gas stream flows downwardly whereat it is accelerated by the outwardly sloping nozzle member 30. The accelerating gas stream passes through opening 36 and contacts surface 26 at a sufficient velocity to cause the retention of substantially all the particulate matter by the impinging liquid 26. After the gas passes through opening 36 it then exits from scrubber 10 through a central outlet passageway 38, such passageway 38 being bounded by the inner peripheral surfaces of nozzle member 30, riser duct 16, and that portion of casing 12 upwardly of retaining plate 18.

As the gas stream contacts surface 26, a portion of particulate matter from such gas stream is retained by the main body of impinging liquid 26 and another portion thereof is encapsulated by droplets of liquid 26.

Such droplets are forced upwardly by the gas stream exiting from scrubber 10. The axial extent of duct 16 together with a somewhat turbulent flow of the gas stream exiting upwardly therethrough results in duct 16 acting as an agglomerator chamber for the droplets passing upwardly therethrough thereby causing a portion of such droplets to agglomerate such that the weight thereof can no longer be carried by the upwardly flowing gas stream and as such, such agglomerated droplets fall downwardly into the main pool of impinging liquid 26. The upwardly flowing gas stream exits from duct 16 through well known swirl vanes 40 which are suitably affixed to the interior of duct 16 downwardly adjacent the upper end thereof. Swirl vanes 40 impart a radial force to the droplets exiting therefrom thereby resulting in such droplets striking the inner periphery of casing 12 upwardly of duct 16. Upon striking the casing 12, such droplets are effectively removed from the upwardly flowing gas stream, which gas stream thereafter exits from scrubber 10 through the gas outlet 14. The droplets which strike the inner periphery of casing 12 flow downwardly along such peripheral surface and are accumulated in an upwardly open annular sump 42. Sump 42 comprises inner and outer side walls respectively formed by the outer periphery of duct portion 19 and the portion of the inner periphery of casing 12 which is radially spaced from portion 19; and a base formed by the upper surface of retaining plate 18. Suitable drain means (not shown) are provided for the removal of the accumulated droplets from sump 42.

It is to be noted that the invention herein resides in the unique means of accelerating the incoming gas stream. Heretofore prior approaches of obtaining such acceleration for a scrubber of the general type illustrated above resulted in a quiescent zone developing downwardly adjacent the outer side of the accelerating nozzle. Because the outer side of the nozzle opening 36 of the present invention is formed by the vertical sidewall of the casing 12, no quiescent zone can develop at such opening 36, thereby resulting in a maximum efficiency of scrubber operation. Additionally, the use of casing 12 as a side wall of opening 36 results in a maximum utilization of available scrubber floor space and also a minimum fabrication difficulties and material quantities.

Figure 3:
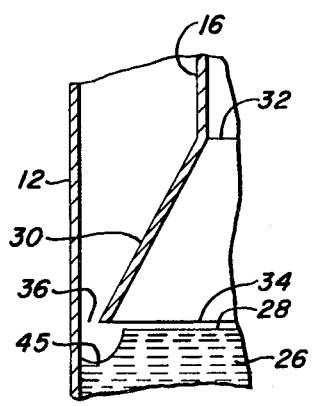
FIG. 3 is an enlarged cross-sectional view of a portion of the nozzle opening shown in FIG. 2.

For further amplification of the absence of a quiescent zone when using a nozzle of this invention, reference is made to FIG. 3 which illustrates a portion of nozzle opening 36 and the condition of the surface 28 of liquid 26 below such opening when a gas stream is flowing through opening 36. The pressure exerted by the gas stream discharged from nozzle opening 36 on the surface 28 results in an annular downwardly depressed area 45 in liquid 26 below the surface 28 thereof. Area 45 comprises a generally J shaped cross section with the short leg thereof terminating at the inner periphery of casing 12 below the surface 28 and with the long leg of area 45 terminating at surface 28 inwardly from the internal periphery of nozzle member 30. The fact that the short leg of area 45 intersects casing 12 below the level of surface 28 indicates that the impinging liquid 26 is in constant circulation along area 45 and as such no quiescent zone can develop throughout the area 45.

Inasmuch as the invention herein pertains to a means for accelerating a gas stream as discussed hereinabove, various modifications can be made to the impingement scrubber described without departing from the scope of this invention, for example: gas outlet 14 need not be centrally positioned as shown; although opening 36 is illustrated as a generally annular cross section such opening can be of other cross sections, for example oval, elliptical, square and rectangular, assuming suitable adjustments are made in the configuration of casing 12 and nozzle member 30; casing 12 need not necessarily be of a generally vertical cylindrical configuration as shown but can be of other suitable shapes as long as inner peripheral portion thereof adjacent opening 36 is of substantially uniform cross section; and the like.

The scope of this invention is defined by the claims set forth hereinafter.

What is claimed is:

1. A gas scrubbing apparatus comprising: an elongated upstanding housing having an axially extending portion of substantially uniform inner cross section; an open ended conduit providing a gas outlet passageway from said housing and having an upper outlet and freely communicating with the exterior of said housing, said conduit having an elongated portion thereof extending axially within and inwardly spaced from said axially extending portion of said housing to define a gas inlet passageway portion only in conjunction therewith, said elongated portion of said conduit having a continuous obliquely outwardly extending circumferential portion at the lowermost end thereof with the outermost end of said circumferential portion being spaced from said axially extending portion of said housing to define a gas flow nozzle in conjunction therewith, said gas inlet passageway portion upwardly of said nozzle having a cross sectional area at least as great as four times the cross sectional area of the lower end of said nozzle, said gas outlet passageway having a cross sectional area greater than said inlet passageway and at least as great as nine times the cross sectional area of the lower end of said nozzle; the bottom portion of said housing below said nozzle forming a sump; a liquid within said sump which causes impingement of a gas stream being discharged from said nozzle, and said housing having gas inlet means communicating between said passageway portion and the exterior of said housing.

2. A gas scrubbing apparatus as described in claim 1 wherein said axially extending portion of said housing extends adjacent said circumferential portion of said conduit.

3. A gas scrubbing apparatus as described in claim 2 wherein said axially extending portion and said circumferential portion are of a generally circular cross section.

4. A gas scrubbing apparatus as described in claim 2 wherein said housing and said conduit are of a generally circular cross section.

5. A gas scrubbing apparatus as described in claim 1 wherein said axially extending portion of said housing extends adjacent said elongated portion of said conduit.

6. A gas scrubbing apparatus as described in claim 5 wherein said circumferential portion and said axially extending portion are coaxial.

7. A gas scrubbing apparatus as described in claim 6 wherein said inlet passageway has an upper closed end thereof defined by an annular member, said annular member having the outer periphery thereof sealingly secured to the inner periphery of said housing and the inner periphery thereof sealingly secured to the outer periphery of said conduit.

* * * * *